United States Patent
Unnerstall

(10) Patent No.: US 11,055,790 B2
(45) Date of Patent: Jul. 6, 2021

(54) SYSTEMS AND METHODS FOR PROVIDING AN INDICATION OF LOCAL SALES TAX RATES TO A USER

(71) Applicant: MASTERCARD INTERNATIONAL INCORPORATED, Purchase, NY (US)

(72) Inventor: Rick Unnerstall, O'Fallon, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 401 days.

(21) Appl. No.: 15/882,176

(22) Filed: Jan. 29, 2018

(65) Prior Publication Data
US 2019/0236715 A1    Aug. 1, 2019

(51) Int. Cl.
| | |
|---|---|
| G06Q 40/00 | (2012.01) |
| G06Q 20/20 | (2012.01) |
| G06F 16/29 | (2019.01) |
| G06F 16/951 | (2019.01) |
| G06Q 30/06 | (2012.01) |

(52) U.S. Cl.
CPC .......... *G06Q 40/10* (2013.01); *G06F 16/29* (2019.01); *G06F 16/951* (2019.01); *G06Q 20/207* (2013.01); *G06Q 30/0629* (2013.01)

(58) Field of Classification Search
USPC ........................................................ 705/31
See application file for complete search history.

(56) References Cited

U.S. PATENT DOCUMENTS

| | | | | |
|---|---|---|---|---|
| 7,971,180 | B2* | 6/2011 | Kreamer | G06F 8/20 |
| | | | | 717/101 |
| 8,006,223 | B2* | 8/2011 | Boulineau | G06Q 10/06313 |
| | | | | 717/101 |
| 9,223,496 | B2 | 12/2015 | Howard et al. | |
| 9,412,118 | B2* | 8/2016 | Loomis | G06Q 20/3278 |
| 9,418,386 | B2 | 8/2016 | Fox et al. | |
| 9,448,718 | B2 | 9/2016 | Howard et al. | |
| 9,589,259 | B2 | 3/2017 | McNeel | |
| 9,665,874 | B2* | 5/2017 | Chau | G06Q 30/0255 |

(Continued)

OTHER PUBLICATIONS

O. Uzunerand L. McKnight, "Sales taxes on the Internet: when and how to tax?," Proceedings of the 34th Annual Hawaii International Conference on System Sciences, Maui, HI, USA, 2001, pp. 9 pp.-, (Sales Tax) (Year: 2001).*

*Primary Examiner* — Chikaodinaka Ojiaku
(74) *Attorney, Agent, or Firm* — Armstrong Teasdale LLP

(57) ABSTRACT

A sales tax analysis computing device is configured to: (i) build a database table of locality sales tax data, the database table comprising a plurality of sales tax rates, each sales tax rate of the plurality of sales tax rates associated with a particular locality; (ii) receive at least one of a) transaction data and b) a request from a mobile communications device of a user for locality sales tax data; (iii) determine a first locality associated with at least one of a) the transaction data and b) the mobile communications device; (iv) determine, based on the database table, a first sales tax rate associated with the first locality; (v) identify, based on the database table, at least one sales tax rate that is less than the first sales tax rate; (vi) generate a code snippet that includes the identified at least one sales tax rate; and (vii) provide the code snippet to the mobile communications device.

20 Claims, 7 Drawing Sheets

(56) References Cited

U.S. PATENT DOCUMENTS

| | | | | |
|---|---|---|---|---|
| 9,684,909 B2* | 6/2017 | Baker | ............... | G06Q 30/0207 |
| 9,715,700 B2* | 7/2017 | Chomsky | ........... | G06Q 30/0255 |
| 9,721,262 B2* | 8/2017 | Krone | ................. | G06Q 30/02 |
| 9,760,871 B1* | 9/2017 | Pourfallah | ......... | G06Q 20/3276 |
| 10,032,193 B1* | 7/2018 | Mendivil | ........... | G06Q 30/0633 |
| 2003/0013438 A1* | 1/2003 | Darby | .................. | H04L 67/04 |
| | | | | 455/419 |
| 2004/0030619 A1 | 2/2004 | Stokes et al. | | |
| 2005/0015299 A1* | 1/2005 | Sisserian | ........... | G06Q 30/0268 |
| | | | | 705/14.38 |
| 2006/0059062 A1* | 3/2006 | Wood | ................. | G06Q 30/0603 |
| | | | | 705/35 |
| 2006/0136309 A1* | 6/2006 | Horn | .................. | G06Q 30/0253 |
| | | | | 705/26.8 |
| 2006/0235776 A1* | 10/2006 | Temme | .................. | G06Q 40/00 |
| | | | | 705/31 |
| 2007/0150369 A1* | 6/2007 | Zivin | ................. | G06Q 30/0631 |
| | | | | 705/26.64 |
| 2007/0288312 A1* | 12/2007 | Wang | ................. | G06Q 30/0277 |
| | | | | 705/14.16 |
| 2008/0120129 A1* | 5/2008 | Seubert | .................. | G06Q 10/10 |
| | | | | 705/35 |
| 2008/0312979 A1* | 12/2008 | Lee | ................. | G06Q 10/06375 |
| | | | | 705/7.28 |
| 2008/0312980 A1* | 12/2008 | Boulineau | .............. | G06Q 10/06 |
| | | | | 705/7.13 |
| 2008/0313008 A1* | 12/2008 | Lee | ........................ | G06Q 10/06 |
| | | | | 705/7.23 |
| 2009/0149200 A1* | 6/2009 | Jayasinghe | ............. | H04W 4/50 |
| | | | | 455/456.3 |
| 2009/0157527 A1* | 6/2009 | Bhambri | ............ | G06Q 30/0601 |
| | | | | 705/26.1 |
| 2009/0276305 A1* | 11/2009 | Clopp | ................... | G06Q 30/00 |
| | | | | 705/14.16 |
| 2012/0072274 A1* | 3/2012 | King | ................. | G06Q 30/0214 |
| | | | | 705/14.16 |
| 2012/0150598 A1* | 6/2012 | Griggs | ............... | G06Q 30/0214 |
| | | | | 705/14.16 |
| 2012/0197690 A1* | 8/2012 | Agulnek | ........... | G01C 21/3697 |
| | | | | 705/14.1 |
| 2012/0209749 A1* | 8/2012 | Hammad | ............. | G06Q 20/204 |
| | | | | 705/27.1 |
| 2012/0253852 A1* | 10/2012 | Pourfallah | ........... | G06Q 20/405 |
| | | | | 705/4 |
| 2013/0024364 A1* | 1/2013 | Shrivastava | ........... | G06Q 20/38 |
| | | | | 705/39 |
| 2013/0024371 A1* | 1/2013 | Hariramani | .......... | G06Q 20/384 |
| | | | | 705/41 |
| 2013/0046602 A1* | 2/2013 | Grigg | ................. | G06Q 30/0261 |
| | | | | 705/14.25 |
| 2013/0151439 A1* | 6/2013 | Galaska | ................. | G06Q 40/00 |
| | | | | 705/36 T |
| 2013/0166332 A1* | 6/2013 | Hammad | ............... | G06Q 20/12 |
| | | | | 705/5 |
| 2013/0297509 A1* | 11/2013 | Sebastian | ............ | G06Q 20/385 |
| | | | | 705/44 |
| 2013/0311335 A1* | 11/2013 | Howard | ............. | G06Q 30/0625 |
| | | | | 705/26.64 |
| 2013/0325640 A1* | 12/2013 | Morgan | ................. | G06Q 30/02 |
| | | | | 705/15 |
| 2013/0344859 A1* | 12/2013 | Abramson | ........ | H04M 1/72463 |
| | | | | 455/418 |
| 2014/0019352 A1* | 1/2014 | Shrivastava | ......... | G06Q 20/326 |
| | | | | 705/41 |
| 2014/0032283 A1* | 1/2014 | Bradford | .............. | G06Q 20/387 |
| | | | | 705/14.1 |
| 2014/0040160 A1* | 2/2014 | Comito | .............. | G06Q 30/0282 |
| | | | | 705/347 |
| 2014/0058796 A1* | 2/2014 | Getchius | ............ | G06Q 30/0255 |
| | | | | 705/7.34 |
| 2014/0108233 A1* | 4/2014 | Yilgoren | ................ | G06Q 50/01 |
| | | | | 705/39 |
| 2014/0180790 A1* | 6/2014 | Boal | ................... | G06Q 30/0211 |
| | | | | 705/14.42 |
| 2014/0180805 A1* | 6/2014 | Argue | ................ | G06Q 30/0241 |
| | | | | 705/14.53 |
| 2014/0214640 A1* | 7/2014 | Mallikarjunan | ..... | G06Q 20/322 |
| | | | | 705/35 |
| 2014/0249916 A1* | 9/2014 | Verhaeghe | ......... | G06Q 30/0633 |
| | | | | 705/14.51 |
| 2014/0279222 A1* | 9/2014 | Lampert | ............ | G06Q 30/0222 |
| | | | | 705/26.35 |
| 2014/0279474 A1* | 9/2014 | Evans | .................... | G06Q 20/40 |
| | | | | 705/41 |
| 2014/0297001 A1* | 10/2014 | Silverman | ............. | G05B 15/02 |
| | | | | 700/19 |
| 2014/0337175 A1* | 11/2014 | Katzin | ................... | G06Q 30/00 |
| | | | | 705/26.62 |
| 2014/0379531 A1* | 12/2014 | Huang | ................. | G06Q 20/207 |
| | | | | 705/26.81 |
| 2015/0039462 A1* | 2/2015 | Shastry | .............. | G06Q 30/0631 |
| | | | | 705/26.7 |
| 2015/0039492 A1* | 2/2015 | Raja | ........................ | G07F 17/42 |
| | | | | 705/39 |
| 2015/0095205 A1* | 4/2015 | Hebner | ................ | G06Q 20/405 |
| | | | | 705/31 |
| 2015/0227937 A1* | 8/2015 | Giles | .................. | G06Q 20/3278 |
| | | | | 705/44 |
| 2015/0248664 A1* | 9/2015 | Makhdumi | ........ | G06Q 20/3276 |
| | | | | 235/380 |
| 2016/0019517 A1* | 1/2016 | Kirsh | .................... | G06Q 20/047 |
| | | | | 705/24 |
| 2016/0323442 A1* | 11/2016 | Kats | ...................... | H04M 1/576 |
| 2017/0132603 A1 | 5/2017 | McNeel | | |
| 2017/0255655 A1* | 9/2017 | Seal | ...................... | G06F 16/211 |

* cited by examiner

SYSTEMS AND METHODS FOR PROVIDING AN INDICATION OF LOCAL SALES TAX RATES TO A USER

BACKGROUND

This disclosure relates generally to systems and methods for providing local sales tax rates to a user, and more particularly to systems and methods for identifying local sales tax rates within a predefined distance of a user's location and, based upon the identification, providing an indication to the user for display on a user device of one or more sales tax rates in a surrounding area (e.g., sales tax rates in one or more adjacent localities) that are lower than the sales tax rate associated with a locality physically occupied by the user.

In the retail industry, consumers of goods and services typically purchase from merchants located in areas that are geographically convenient. For example, many consumers prefer to purchase from merchants within five or ten miles of a location that is convenient to, or already frequented by, the consumer (e.g., a home or office location).

In many areas, however, sales tax rates may vary by locality, such as, for example, from city to city, township to township, and even, in many cases, from city block to city block. Although consumers are occasionally aware of such variations, the magnitude of these variations—even over relatively short distances (e.g., distances of fewer than several miles)—are typically unknown to most consumers. For example, sales tax rates may vary by several percentage points (e.g., five or more percentage points) between localities that are only, in many cases, separated by one or two miles (and occasionally much less).

Over time, such as over the course of a year in the purchasing life of a consumer, these relatively unnoticed variations in regional sales tax may cost consumers upwards of several thousands of dollars, depending, for example, upon the sales tax rate established by a consumer's primary shopping locality and the purchasing habits of the consumer.

Systems and methods for identifying local sales tax rates are therefore desirable. More particularly, systems and methods for providing an indication to a consumer of one or more sales tax rates in a surrounding area (e.g., one or more adjacent localities) that are lower than the sales tax rate associated with a locality occupied by the consumer are desirable.

BRIEF DESCRIPTION

In one aspect, a sales tax analysis computing device including at least one processor in communication with at least one memory device is provided. The sales tax analysis computing device is configured to: (i) build a database table of locality sales tax data, the database table comprising a plurality of sales tax rates, each sales tax rate of the plurality of sales tax rates associated with a particular locality; (ii) receive at least one of a) transaction data and b) a request from a mobile communications device of a user for locality sales tax data; (iii) determine, a first locality associated with at least one of a) the transaction data and b) the mobile communications device; (iv) determine, based on the database table, a first sales tax rate associated with the first locality; (v) identify, based on the database table, at least one sales tax rate of the plurality of sales tax rates that is less than the first sales tax rate; (vi) generate a code snippet that includes the identified at least one sales tax rate; and (vii) provide the code snippet to the mobile communications device, the code snippet causing the mobile communications device to display at least one of a) the identified at least one sales tax rate, b) a map indicating a locality associated with the identified at least one sales tax rate, and c) a difference between a cost of an item in the first locality and a cost of the item in a second locality.

In another aspect, a non-transitory computer readable medium that includes executable instructions for identifying local sales tax rates is provided. When executed by a sales tax analysis computing device including at least one processor in communication with at least one memory device, the computer executable instructions cause the sales tax analysis computing device to: (i) build a database table of locality sales tax data, the database table comprising a plurality of sales tax rates, each sales tax rate of the plurality of sales tax rates associated with a particular locality; (ii) receive at least one of a) transaction data and b) a request from a mobile communications device of a user for locality sales tax data; (iii) determine, a first locality associated with at least one of a) the transaction data and b) the mobile communications device; (iv) determine, based on the database table, a first sales tax rate associated with the first locality; (v) identify, based on the database table, at least one sales tax rate of the plurality of sales tax rates that is less than the first sales tax rate; (vi) generate a code snippet that includes the identified at least one sales tax rate; and (vii) provide the code snippet to the mobile communications device, the code snippet causing the mobile communications device to display at least one of a) the identified at least one sales tax rate, b) a map indicating a locality associated with the identified at least one sales tax rate, and c) a difference between a cost of an item in the first locality and a cost of the item in a second locality.

In a further aspect, a computer-based method for identifying local sales tax rates is provided. The method is performed using a sales tax analysis computing device including at least one processor in communication with at least one memory device. The method includes: (i) building a database table of locality sales tax data, the database table comprising a plurality of sales tax rates, each sales tax rate of the plurality of sales tax rates associated with a particular locality; (ii) receiving at least one of a) transaction data and b) a request from a mobile communications device of a user for locality sales tax data; (iii) determining, a first locality associated with at least one of a) the transaction data and b) the mobile communications device; (iv) determining, based on the database table, a first sales tax rate associated with the first locality; (v) identifying, based on the database table, at least one sales tax rate of the plurality of sales tax rates that is less than the first sales tax rate; (vi) generating a code snippet that includes the identified at least one sales tax rate; and (vii) providing the code snippet to the mobile communications device, the code snippet causing the mobile communications device to display at least one of a) the identified at least one sales tax rate, b) a map indicating a locality associated with the identified at least one sales tax rate, and c) a difference between a cost of an item in the first locality and a cost of the item in a second locality.

BRIEF DESCRIPTION OF THE DRAWINGS

FIG. 1 is a schematic diagram illustrating an example embodiment of a sales tax analysis platform for analyzing sales tax rates by geographic area, such as by locality, in accordance with one embodiment of the present disclosure.

FIG. 2 is a block diagram of the example embodiment of the sales tax analysis platform shown in FIG. 1 including multiple example computing devices communicatively coupled to each other via a plurality of network connections.

FIG. 3 illustrates an example configuration of a server system that includes or is in communication with the sales tax analysis computing device shown in FIG. 2.

FIG. 4 illustrates an example configuration of a user system, such as user computer device configured to transmit data to the sales analysis computing device shown in FIG. 2.

FIG. 5 shows an example configuration of a server system, such as the sales tax analysis computing device shown in FIG. 2.

FIG. 6 shows an example method flow illustrating how the example embodiment of the sales tax analysis computing device shown in FIG. 2 analyzes sales tax rates to provide purchasing assistance to customers.

FIG. 7 shows an example configuration of a database coupled to or included within the example embodiment of the sales tax analysis computing device shown in FIG. 2, which includes sales tax data and transaction data.

Like numbers in the figures indicate the same or functionally similar components.

DETAILED DESCRIPTION

Figure 1:
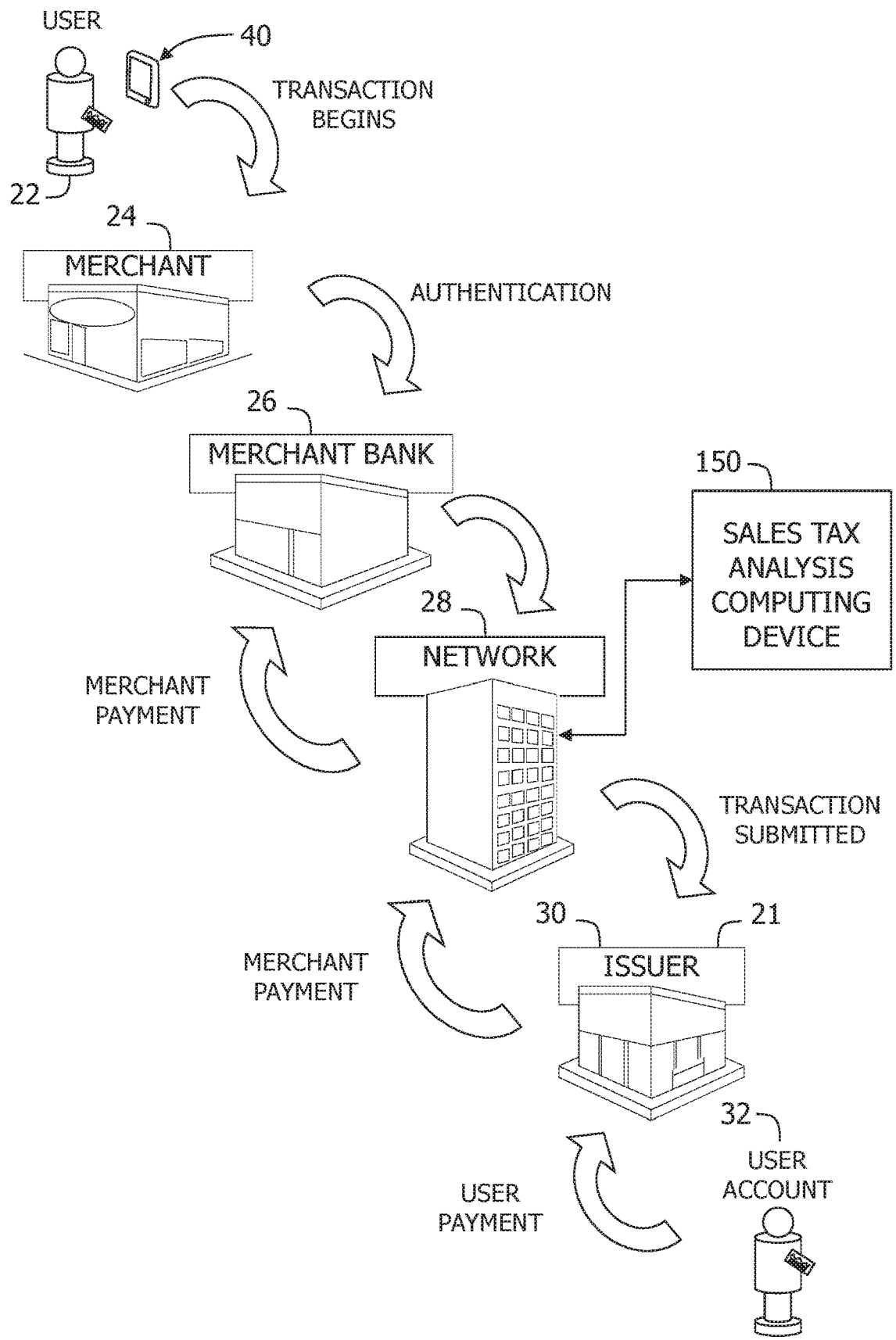
FIGS. 1-7 show example embodiments of the methods and systems described herein.

The present disclosure relates to a sales tax analysis computing device that receives and analyzes sales tax data to identify a plurality of local sales tax rates within a predefined distance of a user and provide an indication, based upon the identification, of at least one locality associated with a sales tax rate that is lower than a sales tax rate of a locality physically occupied by the user, as described herein. Accordingly, in the example embodiment, the sales tax analysis computing device receives at least one of transaction data and/or a request from a mobile communications device of the user for locality sales tax data.

For example, the sales tax analysis computing device may receive transaction data in response to a purchase initiated by a user at a merchant location. Alternatively, the sales tax analysis computing device may receive a request, such as a request initiated by a user via a user computing device (e.g., a mobile communications device), for sales tax locality data (e.g., a request initiated by the user from a software application or "app" running on the user computing device). A user may initiate such a request prior to making a purchase, such as, for example, to identify a merchant in a locality associated with a lower, sales tax rate than the locality presently occupied by the user. In other words, a user may initiate such a request prior to making a purchase to determine whether the purchase might be made, such as from a neighboring or adjacent locality, at a lower sales tax rate.

In response to receiving the transaction data and/or the request from the user computing device, the sales tax analysis computing device may determine a locality (e.g., a "first locality") associated with the transaction data and/or the user computing device. For example, when transaction data is received (indicating that the user has already made a purchase), the sales tax analysis computing device may analyze the transaction data to determine a locality associated with the transaction. In some cases, the transaction data may include or identify the locality. However, in other cases, the sales tax analysis computing device may analyze the transaction data to identify a merchant from which the purchase was made, at which point the sales tax analysis computing device may identify a locality associated with the merchant, such as by retrieving the locality from a database table of merchant localities. On the other hand, in the case of a request from the user computing device for locality sales tax data, the sales tax analysis computing device may determine a location of the user computing device, such as based upon location data (e.g., a GPS location) transmitted by the user computing device to the sales tax analysis computing device with the request.

Once the location of the user is known (e.g., either by way of the merchant location associated with a purchase initiated by the user or by way of the location of the user computing device), the sales tax analysis computing device may determine a sales tax rate (e.g., a "first sales tax rate") associated with the locality currently occupied by the user (and/or occupied by the user at the time of purchase). As described above, this sales tax rate may be retrieved from a database of sales tax rates and/or identified from any other suitable source of locality sales tax rates (e.g., any publicly available source of locality sales tax rates).

In some embodiments, the sales tax analysis computing device may retrieve a look-up table of locality sales tax rates from a database and/or any other publicly available source of locality sales tax data, such as from a flat file or spreadsheet published by a state, city, and/or locality. Similarly, in some embodiments, the sales tax analysis computing device may build, generate, and/or modify a database (including, for example, one or more database tables and/or one or more look-up tables) that contains locality sales tax rates and/or other locality data, such as geographic locations associated with one or more localities. Thus, during operation, the sales tax analysis computing device may rapidly or immediately (e.g., in real-time and/or near real-time) retrieve sales tax data associated with one or more localities, geographic locations associated with one or more localities, and the like.

Further, in some embodiments, a sales tax rate may be identified or determined for a locality based upon transaction data, such as, for example, in the case that the user initiates a purchase within the locality. For example, the sales tax analysis computing device may analyze the transaction data to determine a locality sales tax rate imposed on the transaction. The determined sales tax rate may be populated in the database of sales tax rates described above to build or update the database. In addition, in at least some embodiments, a sales tax rate that is determined based on transaction data may be cross-referenced against an existing sales tax rate stored in the database, such as, for example, to verify and/or update an existing sales tax rate of a locality.

In the example embodiment, the sales tax analysis computing device may, in addition, identify a plurality of localities within a predefined distance of the locality occupied by the user. For example, in some embodiments, the user may provide an indication, such as via the user computing device, of a distance or range that the user is willing to travel to take advantage of a lower locality sales tax rate (e.g., 5 miles, 10 miles, 15 miles, 20 miles, 25 miles, 50 miles, etc.) This user provided distance or range may function, as described herein, as the predefined distance. In other cases, such as, for example, where a user does not select a predefined distance, the sales tax analysis computing device may set a default predefined distance.

Irrespective of the manner in which the predefined distance is set and/or determined, the sales tax analysis computing device may determine a sales tax rate associated with each locality of a plurality of localities within the predefined distance. To make this determination, the sales tax analysis computing device may identify the plurality of localities within the predefined distance, such as based upon locality data contained within the database. In some embodiments, the sales tax analysis computing device may identify the plurality of localities based upon map data, such as map data that specifies a plurality of localities in relation (including distances) to one another. In yet another embodiment, the sales tax analysis computing device may identify the plurality of localities within range of a user based upon a look-up table, a spreadsheet, and/or any other publicly available source of locality data (e.g., based upon the sales tax database, described above). Once the plurality of localities are identified, the locality sales tax rate associated with each locality may be determined, as described herein, such as based upon the database of sales tax rates and/or any other suitable source of locality sales tax rates (e.g., any publicly available source of locality sales tax rates).

In the example embodiment, the sales tax analysis computing device may, in addition, compare the sales tax rate associated with the user's present locality (e.g., the "first sales tax rate") to the plurality of sales tax rates identified for neighboring localities (e.g., localities, as described above, that are within the predefined distance of the first locality). Based upon the comparison, the sales tax analysis computing device may identify at least one sales tax rate of the plurality of sales tax rates that is less than the first sales tax rate. For example, the sales tax analysis computing device may identify a "second sales tax rate" associated with a "second locality" that is within the predefined distance of the first locality and that offers a lower sales tax rate than the sales tax rate offered by the first locality.

On completion of this step, the sales tax analysis computing device may provide an indication to the user computing device of the one or more localities within range of the user and from which the user may make a purchase at a lower sales tax rate. For example, the sales tax analysis computing device may provide an indication of a locality name, a locality location, a distance to the locality, and the like, such as in the form of a text message or email delivered to the user computing device, a message delivered to a mobile application running on the user computing device, and the like. Specifically, the sales tax analysis computing device may generate a "code snippet," which may cause the mobile communications device to provide or display the indication described above. As used herein, a "code snippet" may include any data or computer-implemented instructions that may be provided to the mobile communications device and/or interpreted by the mobile communications device to cause to the mobile communications device to display information, such as sales tax information and/or locality information, to the user.

In some embodiments, the sales tax analysis computing device may also provide navigation instructions (e.g., via the code snippet) to the user computing device, which may be provided, within the user computing device, to a navigation application (e.g., GOOGLE MAPS, APPLE MAPS, and the like) running on the user computing device, and which may serve to guide the user to the locality and/or one or more merchants occupying the locality from which the user may make a desired purchase at a lower sales tax rate.

In certain embodiments, the sales tax analysis may receive a request (e.g., API call) from a navigation application on a user device, including a destination location. The request may include the navigation destination. In response to the request, the sales tax analysis computing device may transmit a response including a locality sales tax rate associated with the destination. In one embodiment, the response is an API response (e.g., HTTP response) configured to display a locality sales tax rate associated with the destination in the navigation application.

In some embodiments, where a user has yet to make a purchase and has requested locality sales tax data via the user computing device (as described above), the sales tax analysis computing device may receive an indication of an item that the user wishes to purchase (such as via a software application or "app" running on the user computing device). In response, the sales tax analysis computing device may determine whether the item is available for purchase within the user's present locality (e.g., within the "first locality") and if so, what the local sales tax imposed on the item would be within the first locality. The sales tax analysis computing device may, in addition, determine a price of the item, as advertised by one or more merchants residing in the first locality. With these two pieces of information (e.g., item price and locality sales tax rate), the sales tax analysis computing device may determine a total price of the item if purchased from one or more merchants in the first locality.

Similarly, the sales tax analysis computing device may determine whether the item is available for purchase from one or more merchants within one or more neighboring localities (e.g., localities within the predefined distance), and if so, what the local sales tax imposed on the item would be within these neighboring localities. The sales tax analysis computing device may, in addition, determine a price of the item, as advertised by one or more merchants residing in the neighboring localities. With these two pieces of information (e.g., item price and locality sales tax), the sales tax analysis computing device may determine a total price of the item from one or more merchants in the neighboring localities.

In the example embodiment, the sales tax analysis computing device may, based upon the total item prices calculated as described above, compare each total item price to determine whether it would be less expensive for the user to purchase the item, including the locality sales tax, from a merchant in a neighboring locality. If so, the sales tax analysis computing device may provide an indication, as described above, to the user computing device of one or more neighboring localities and/or merchant locations from which the user may make the user's desired purchase at a reduced cost to the user (in comparison to the total cost of the item in the first locality).

Similarly, in the circumstance that the user has already purchased an item in a particular locality (e.g., the "first locality"), the sales tax analysis computing device may simply determine the purchase price paid for the item by the user in the first locality, including sales tax imposed by the first locality, to initiate a comparison between what the user actually paid in the first locality to prices the user might have paid, including various locality taxes, in one or more neighboring localities. This data may be provided to the user, as described above, such that the user is, at a minimum, made aware of the availability of the item at a reduced cost to the user in a neighboring locality and, such that the user is able, if desired, to return the purchased item to the merchant in the first locality, whereupon the user may travel a short distance to the neighboring locality to purchase the same item from a different merchant (or the same merchant at a different merchant location) at a reduced cost.

Similarly, the systems and methods described herein may be deployed by users confronted by ballot questions related to increases in local or community sales tax rates. For example, a user who encounters a ballot question enquiring whether the user supports an in increase in the sales tax rate associated with the user's locality may consult the software application described herein and running on the user computing device to quickly and easily ascertain a current locality tax as well as what the current locality tax is in comparison to neighboring localities. This data may provide the user with valuable insight, for example, into the fact that a proposed sales tax increase would result in a total locality sales tax that is substantially greater than other locality sales tax rates implemented in neighboring localities or, on the other hand, that such a proposed increase would not result in a total locality sales tax disproportionate to locality sales taxes imposed by neighboring localities.

The technical problems addressed by the sales tax analysis computing platform include at least one of: (i) inability of accurately and rapidly determining a locality sales tax rate associated with a locality occupied by a user, (ii) inability of identifying a plurality of neighboring localities within a predefined distance of the user, (iii) inability of identifying locality tax rates associated with each of the neighboring localities, (iv) inability of comparing the sales tax rate of the locality occupied by the user with the sales tax rates of neighboring localities, and (v) inability of generating and digitally presenting an indication of a neighboring locality offering a lower sales tax rate than the sales tax rate associated with the locality occupied by the user.

The methods and systems described herein may be implemented using computer programming or engineering techniques including computer software, firmware, hardware, or any combination or subset thereof, wherein the technical effects may be achieved by: (i) building a database table of locality sales tax data, the database table comprising a plurality of sales tax rates, each sales tax rate of the plurality of sales tax rates associated with a particular locality; (ii) receiving at least one of a) transaction data and b) a request from a mobile communications device of a user for locality sales tax data; (iii) determining, a first locality associated with at least one of a) the transaction data and b) the mobile communications device; (iv) determining, based on the database table, a first sales tax rate associated with the first locality; (v) identifying, based on the database table, at least one sales tax rate of the plurality of sales tax rates that is less than the first sales tax rate; (vi) generating a code snippet that includes the identified at least one sales tax rate; and (vii) providing the code snippet to the mobile communications device, the code snippet causing the mobile communications device to display at least one of a) the identified at least one sales tax rate, b) a map indicating a locality associated with the identified at least one sales tax rate, and c) a difference between a cost of an item in the first locality and a cost of the item in a second locality.

The resulting technical benefits achieved by the sales tax analysis computing platform include at least one of: (i) accurately and rapidly (e.g., in real time or near real-time) determining, such as based on one or more sales tax tables stored in a database, a locality sales tax rate associated with a locality occupied by a user, (ii) identifying a plurality of neighboring localities within a predefined distance of the user, (iii) identifying (e.g., in real time or near real-time) locality tax rates associated with each of the neighboring localities, such as based on the one or more sales tax tables stored in the database, (iv) comparing the sales tax rate of the locality occupied by the user with the sales tax rates of neighboring localities, and (v) generating and digitally presenting an indication of a neighboring locality offering a lower sales tax rate than the sales tax rate associated with the locality occupied by the user.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are examples only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are examples only, and are thus not limiting as to the types of memory usable for storage of a computer program.

In one embodiment, a computer program is provided, and the program is embodied on a computer readable storage medium. In an example embodiment, the system is executed on a single computer system, without requiring a connection to a server computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The following detailed description illustrates embodiments of the disclosure by way of example and not by way of limitation. It is contemplated that the disclosure has general application in industrial, commercial, and academic applications.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, and as described in additional detail below, "transaction data" may include any data collected by, analyzed, and/or generated by a sales tax analysis computing platform and/or by a transaction card system, such as a payment card system, as described below. Thus, "transaction data" may include a variety of purchasing data, such as purchase information, user information, merchant information, and the like, where such information may, in some cases, be derived from a purchase initiated by a user and submitted for processing, authorization, and/or payment by a merchant.

In various embodiments, transaction data may be anonymized and/or aggregated prior to receipt by the sales tax analysis computing device (e.g., in some cases, no personally identifiable information (PII) is received by the sales tax analysis computing device). In other embodiments, the sales tax analysis computing device may be configured to receive transaction data that is not yet anonymized and/or aggregated; however, the sales tax analysis computing device and may be configured to anonymize and/or aggregate the transaction data. In such embodiments, any PII received by the sales tax analysis computing device may be received and processed in an encrypted format, or may be received with the consent of users with which the PII is associated. In other words, users may be prompted, prior to collection and/or analysis of transaction data, to opt-in or request participation in the processes implemented by the systems and methods described herein. In situations in which the systems discussed herein collect PII about individuals including users and/or merchants, users may be provided with an opportunity to control whether such information is collected or to control whether and/or how such information is used. In addition, certain data may be processed in one or more ways before it is stored or used, so that personally identifiable information is removed or anonymized.

FIG. 1 is a schematic diagram illustrating an example embodiment of a sales tax analysis platform for analyzing sales tax rates by geographic area, such as by locality, and for providing an indication of one or more sales tax rates, by locality, to a user. Embodiments described herein may relate to a transaction card system, such as a payment card processing system using the Mastercard® interchange network. The Mastercard® interchange network is a set of proprietary communications standards promulgated by Mastercard® International Incorporated for the exchange of financial transaction data and the settlement of funds between financial institutions that are members of Mastercard® International Incorporated. (Mastercard® is a registered trademark of Mastercard® International Incorporated located in Purchase, N.Y.).

Embodiments described herein also relate to a sales tax analysis computing device 150 that is communicatively coupled to an interchange network 28. In general, sales tax analysis computing device 150 is any suitable computing device, such as a server computing device and/or a network of server computing devices, configured to analyze sales tax rates by geographic area, such as by locality, and to provide an indication of one or more sales tax rates, by locality, to a user. To this end, sales tax analysis computing device 150 may include one or more computer processors communicatively coupled to one or more tangible, non-transitory, computer readable memories. The one or more computer processors of tax analysis computing device 150 may retrieve and execute computer readable instructions stored on the one or more computer readable memories to implement the processes described below. For example, at a high level, the one or more computer processors may execute computer readable instructions stored on one or more computer readable memories to analyze sales tax rates by geographic area, such as by locality, and to provide an indication of one or more sales tax rates, by locality, to a user.

To this end, sales tax analysis computing device 150 may be communicatively coupled to interchange network 28 for the purpose of obtaining transaction data associated with a purchase to provide an indication to a user (or cardholder) related to an amount of money that the user might have saved if the purchase had been made in a neighboring locality (e.g., a locality associated with a lower sales tax rate), and/or for the purpose of populating a sales tax database with sales tax data of a locality from which a purchase was made. In some embodiments, a sales tax rate may be obtained or derived from transaction data and used as part of a secondary check or validation step, in which an existing locality sales tax rate is verified in a database of locality sales tax data against a sales tax rate that is determined by analyzing the transaction data.

In the example sales tax analysis platform, a financial institution called the "issuer" or "issuer bank" issues an account, such as a credit card account, to the user 22, who uses the account to tender payment for a purchase from a merchant 24. In one embodiment, the user presents a digital wallet to merchant 24 (also known as a card-present transaction) using a user computing device. In another embodiment, the user does not present a digital wallet and instead performs a card-not-present transaction. For example, the card-not-present transaction may be initiated via a digital wallet application, through a website or web portal, via telephone, or any other method that does not require the user to present a physical payment card to merchant 24 (e.g., via scanning the digital wallet). In yet another embodiment, the user presents a payment instrument, such as a payment or transaction card, to merchant 24 to tender payment for a purchase.

To accept payment, merchant 24 establishes an account with a financial institution that is part of the financial payment system. This financial institution is usually called the "merchant bank," the "acquiring bank," or the "acquirer." In one embodiment, user 22 tenders payment for a purchase using a transaction card at a transaction processing device 40 (e.g., a point of sale device), then merchant 24 requests authorization from a merchant bank 26 for the amount of the purchase. The request is usually performed through the use of a point-of-sale terminal, which reads user 22's account information from a magnetic stripe, a chip, barcode, or embossed characters on the transaction card and communicates electronically with the transaction processing computers of merchant bank 26. Alternatively, merchant bank 26 may authorize a third party to perform transaction processing on its behalf. In this case, the point-of-sale terminal will be configured to communicate with the third party. Such a third party is usually called a "merchant processor," an "acquiring processor," or a "third party processor."

Using an interchange network 28, computers of merchant bank 26 or a merchant processor will communicate with computers of an issuer bank 30 to determine whether user 22's account 32 is in good standing and whether the purchase is covered by user 22's available credit line. Based on these determinations, the request for authorization will be declined or accepted. If the request is accepted, an authorization code is issued to merchant 24.

When a request for authorization is accepted, the available credit line of user 22's account 32 is decreased. Normally, a charge for a payment card transaction is not posted immediately to user 22's account 32 because certain rules do not allow merchant 24 to charge, or "capture," a transaction until goods are shipped or services are delivered. However, with respect to at least some debit card transactions, a charge may be posted at the time of the transaction. When merchant 24 ships or delivers the goods or services, merchant 24 captures the transaction by, for example, appropriate data entry procedures on the point-of-sale terminal. This may include bundling of approved transactions daily for standard retail purchases. If user 22 cancels a transaction before it is captured, a "void" is generated. If user 22 returns goods after the transaction has been captured, a "credit" is generated. Interchange network 28 and/or issuer bank 30 stores the transaction card information, such as a type of merchant, amount of purchase, date of purchase, in a database 120 (shown in FIG. 2).

After a purchase has been made, a clearing process occurs to transfer additional transaction data related to the purchase among the parties to the transaction, such as merchant bank 26, interchange network 28, and issuer bank 30. More specifically, during and/or after the clearing process, additional data, such as a time of purchase, a merchant name, a type of merchant, purchase information, user account information, a type of transaction, information regarding the purchased item and/or service, and/or other suitable information, is associated with a transaction and transmitted between parties to the transaction as transaction data, and may be stored by any of the parties to the transaction.

After a transaction is authorized and cleared, the transaction is settled among merchant 24, merchant bank 26, and issuer bank 30. Settlement refers to the transfer of financial data or funds among merchant 24's account, merchant bank 26, and issuer bank 30 related to the transaction. Usually, transactions are captured and accumulated into a "batch," which is settled as a group. More specifically, a transaction is typically settled between issuer bank 30 and interchange network 28, and then between interchange network 28 and merchant bank 26, and then between merchant bank 26 and merchant 24.

As described above, the various parties to the payment card transaction include one or more of the parties shown in FIG. 1 such as, for example, user 22, merchant 24, merchant bank 26, interchange network 28 (also referred to herein as payment processor 28), issuer bank 30, and/or an issuer processor 21.

Figure 2:
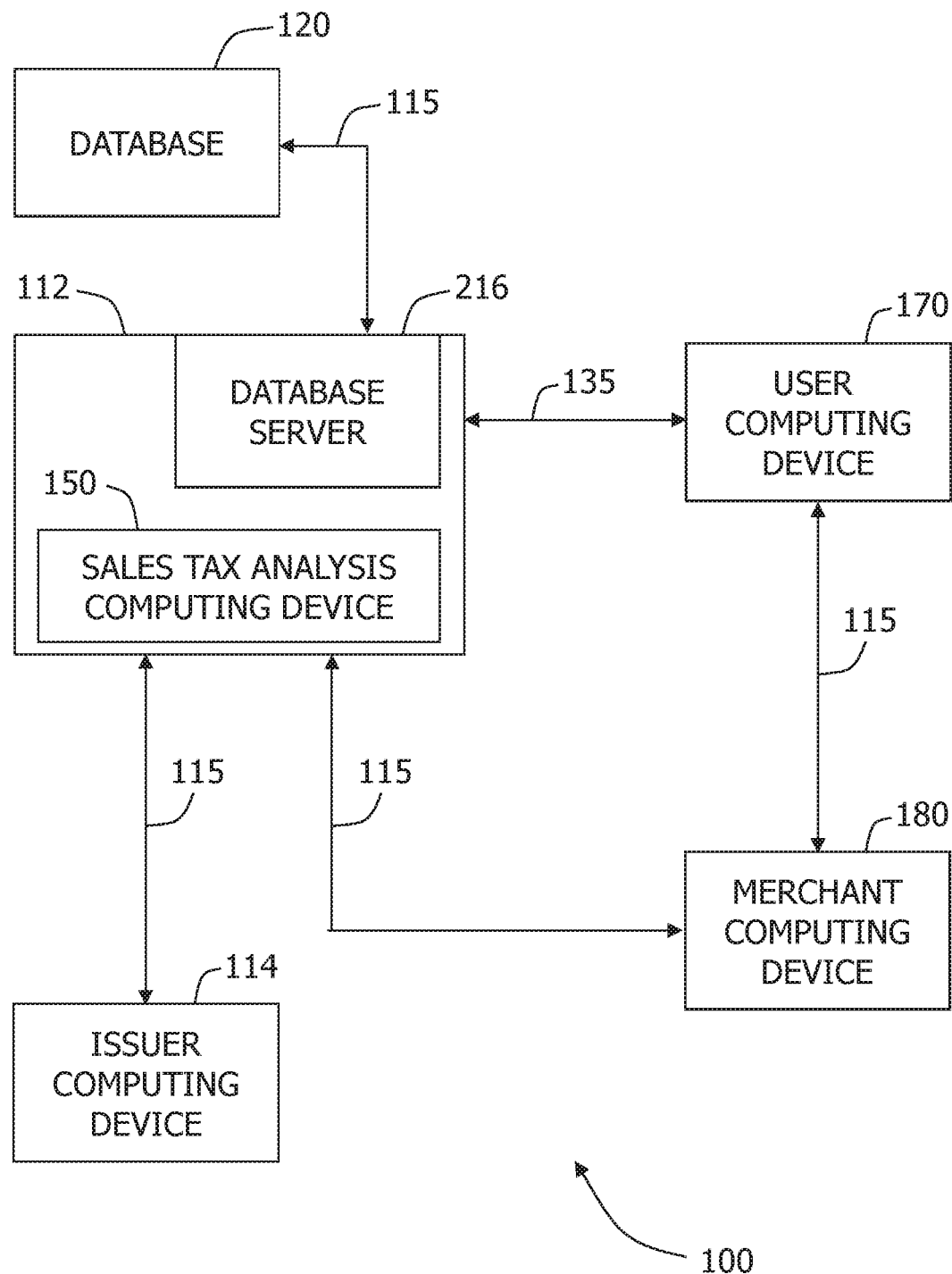

FIG. 2 is a block diagram of an example embodiment of sales tax analysis computing platform 100, in which a variety of computing devices are communicatively coupled to each other via a plurality of network connections. These network connections may be internet, LAN/WAN (Local Area Network/Wide Area Network), or other connections capable of transmitting data across computing devices. Sales tax analysis computing platform 100 includes sales tax analysis computing device 150 and a database server 216, which may include, as described herein, sales tax data, such as sales tax data obtained by analyzing transaction data, sales tax rate data associated with or tied to a particular locality, and the like. In one embodiment, sales tax analysis computing device 150 and database server 216 are components of server system 112, which may, as described above, be configured to analyze sales tax rates by geographic area, such as by locality, and to provide an indication of one or more sales tax rates, by locality, to a user. In some embodiments, server system 112 is part of payment processor 28 (shown in FIG. 1); however, in other embodiments, server system 112 may be physically separate from payment processor 28. In addition, server system 112 may be a server, a network of multiple computer devices, a virtual computing device, or the like. Sales tax analysis computing device 150 is connected to at least one user computing device 170, a merchant computing device 180 (associated with merchant 24 and/or merchant bank 26, shown in FIG. 1), and an issuer computing device 114 (associated with issuer 30, shown in FIG. 1) via at least a network connection 115.

In one embodiment, sales tax analysis computing device 150 is configured to receive transaction data from merchant computing device 180, over a network connection 115. Sales tax analysis computing device 150 may be operated by and/or affiliated with interchange network 28. Alternatively, sales tax analysis computing device 150 may be operated by and/or affiliated with any entity that enables sales tax analysis computing device 150 to function as described herein.

In some embodiments, interchange network 28 may be configured to process authorization messages, such as ISO 8583 compliant messages and ISO 20022 compliant messages. As used herein, "ISO" refers to a series of standards approved by the International Organization for Standardization (ISO is a registered trademark of the International Organization for Standardization of Geneva, Switzerland). ISO 8583 compliant messages are defined by the ISO 8583 standard which governs financial transaction card originated messages and further defines acceptable message types, data elements, and code values associated with such financial transaction card originated messages. ISO 8583 compliant messages include a plurality of specified locations for data elements. ISO 20022 compliant messages are defined by the ISO 20022 standard. For example, ISO 20022 compliant messages may include acceptor to issuer card messages (ATICA).

As noted with respect to FIG. 1, when a user performs a transaction at a merchant location, transaction data is generated. In one embodiment, when a user performs a transaction at merchant computing device 180 associated with a merchant, transaction data for the transaction is transmitted to server system 112. Server system 112 processes the transaction data in the manner described with respect to FIG. 1 and also provides it to sales tax analysis computing device 150. Specifically, and in some embodiments, sales tax analysis computing device 150 may monitor one or more ISO 8583 messages as they are provided over interchange network 28. When sales tax analysis computing device 150 detects the occurrence of one or more transactions, such as based upon the receipt of an ISO 8583 message, sales tax analysis computing device 150 may calculate a tax savings as compared to anther locality (e.g., as described herein) and send a real-time indication to user computing device 170 of the tax savings, such that a user of user computing device 170 may decide whether he or she wants to refund an item purchased prior to departing a merchant location from which an item was purchased (e.g., the item purchase giving rise to the ISO 8583 message). Sales tax analysis computing device 150 is also configured to communicate with user computing device 170 via an electronic communication channel or method that is distinct from one used to communicate transaction data. In the example embodiment, sales tax analysis computing device 150 is configured to communicate with user computing device 170 via electronic communication channel 135.

The transaction data may also include a transaction amount, a transaction date, account data related to the payment card used to perform the transaction (e.g., primary account number associated with payment card, card expiration date, card issuer, card security code, or the like), a merchant identifier, stock-keeping unit (SKU) data relating to the goods or services purchased from the user, or the like.

Database server 216 is connected to database 120, which contains information on a variety of matters, as described below in greater detail. In one embodiment, database 120 is stored on server system 112 and can be accessed by potential users of server system 112. In an alternative embodiment, database 120 is stored remotely from server system 112 and may be non-centralized. Database 120 may include a single database having separated sections or partitions or may include multiple databases, each being separate from each other. Database 120 may store demographic data for each user in communication with sales tax analysis computing device 150.

In the example embodiment, sales tax analysis computing device 150 includes specifically designed computer hardware to perform the steps described herein, and includes specifically designed computer implementation instructions. Sales tax analysis computing device 150 is a specially designed and customized computer device built to perform the specific functions of collecting and analyzing transaction data and/or sales tax data, such as by locality, and providing a recommendation to a user identifying a locality associated with a lower sales tax, as described herein.

Figure 3:
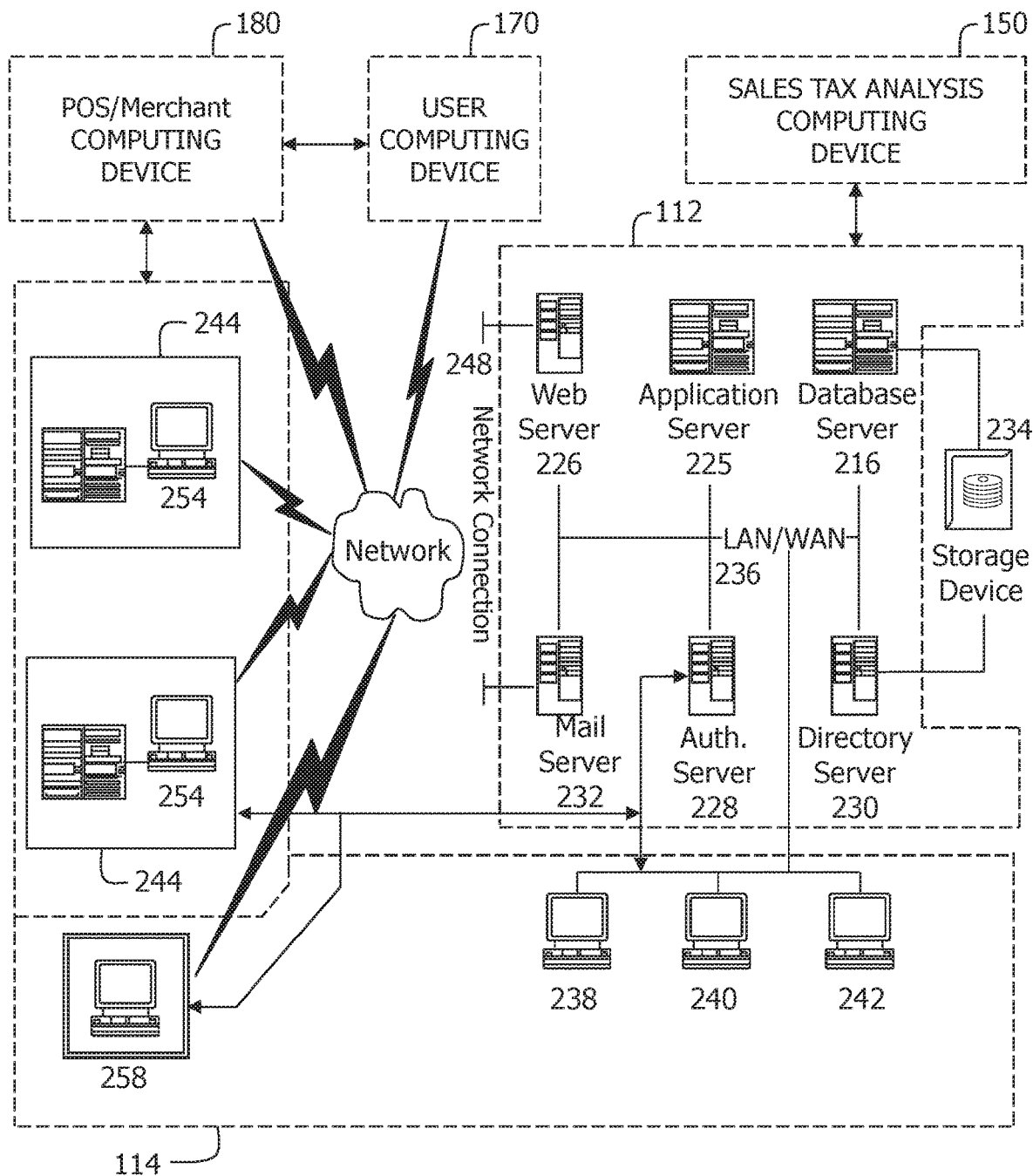

FIG. 3 is an expanded block diagram of an example embodiment of server architecture of sales tax analysis computing platform 100 (shown in FIG. 2) including other computer devices in accordance with one embodiment of the present disclosure. Components in sales tax analysis computing platform 100 are identified in FIG. 3 using the same reference numerals as used in FIG. 2. Sales tax analysis computing platform 100 includes server system 112. Server system 112 further includes database server 216, an application server 225, a web server 226, an authentication server 228, a directory server 230, and a mail server 232. A storage device 234 is coupled to database server 216 and directory server 230. Servers 216, 225, 226, 228, 230, and 232 are coupled in a network connection, such as LAN/WAN 236. In addition, an issuer bank workstation 238 (similar to issuer computing device 114 shown in FIG. 2), acquirer bank workstation 240, and a third party processor workstation 242 may be coupled to LAN/WAN 236.

In the example embodiment, issuer bank workstation 238, acquirer bank workstation 240, and third party processor workstation 242 are coupled to LAN/WAN 236 using network connection 115 (shown in FIG. 2). Workstations 238, 240, and 242 are coupled to LAN/WAN 236 using an internet link or are connected through an intranet. In the example embodiment, sales tax analysis computing device 150 is in communication with issuer bank workstation 238 and POS/merchant computing device 180 (which may be, for example, the same as merchant computing device 180, as shown in FIG. 2). User computing device 170 is connected to the internet and may be a smartphone, personal computer, tablet computer, desktop, laptop, or similar computing device. Sales tax analysis computing device 150 is configured to receive transaction data, from POS/merchant computing device 180 and user computing device 170 via server system 112.

Each workstation 238, 240, and 242 is a computer with internet access. Although the functions performed at the workstations typically are illustrated as being performed at respective workstations 238, 240, and 242, such functions can be performed at one of many personal computers coupled to LAN/WAN 236. Workstations 238, 240, and 242 are illustrated as being associated with separate functions only to facilitate an understanding of the different types of functions that can be performed by individuals having access to LAN/WAN 236.

Server system 112 is configured to be communicatively coupled to various individuals, including employees and third parties 244 (e.g., auditors, developers, merchants, acquirers, issuers, etc.), using an ISP internet connection 248. The communication in the example embodiment is illustrated as being performed using the internet. However, any other wide area network (WAN) type communication can be utilized in other embodiments. In other words, the systems and processes are not limited to being practiced using the internet.

In the example embodiment, any authorized individual having a workstation 254 can access sales tax analysis computing platform 100. At least one of the client systems includes a manager workstation 258 located at a remote location. Workstations 254 and 258 are personal computers having a web browser. Also, workstations 254 and 258 are configured to communicate with server system 112. Furthermore, authentication server 228 communicates with remotely located client systems, including a client system 238 using a telephone link. Authentication server 228 is configured to communicate with other client workstations 238, 240, and 242 as well.

Figure 4:
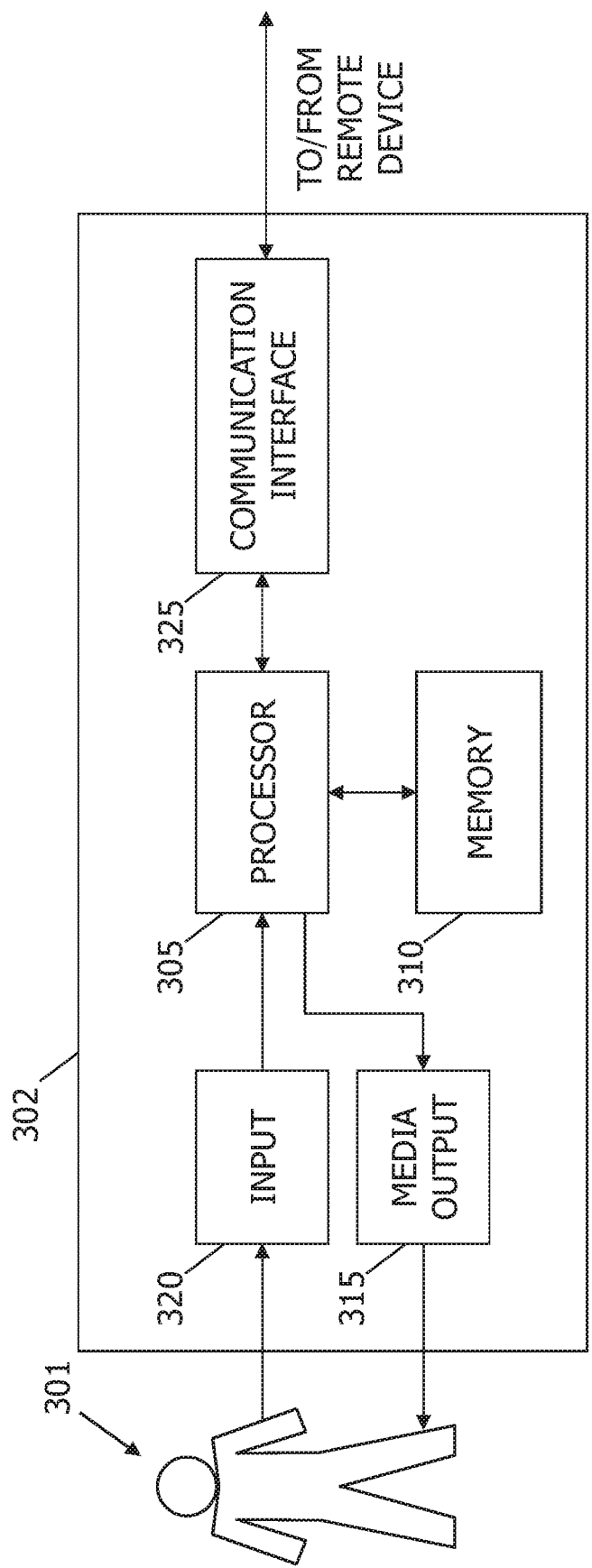

FIG. 4 illustrates an example configuration of a user system, such as a user computing device configured to transmit data to sales tax analysis computing device 150. User system 302 may include, but is not limited to, user computing device 170 (shown in FIG. 2). In some embodiments, user system 302 may also include merchant computing device 180 and/or issuer computing device 114 (shown in FIG. 2). In the example embodiment, user system 302 includes a processor 305 for executing instructions. In some embodiments, executable instructions are stored in a memory area 310. Processor 305 may include one or more processing units, for example, a multi-core configuration. Memory area 310 is any device allowing information such as executable instructions and/or written works to be stored and retrieved. Memory area 310 may include one or more computer readable media.

User system 302 also includes at least one media output component 315 for presenting information to user 301. In some embodiments, user 301 is an individual; however, in other embodiments, user 301 may be a card issuer, a merchant, and/or an acquirer (as described herein). Media output component 315 is any component capable of conveying information to user 301. For example, media output component 315 may be a display component configured to display component lifecycle data in the form of reports, dashboards, communications, or the like. In some embodiments, media output component 315 includes an output adapter such as a video adapter and/or an audio adapter. An output adapter is operatively coupled to processor 305 and operatively connectable to an output device such as a display device, a liquid crystal display (LCD), organic light emitting diode (OLED) display, or "electronic ink" display, or an audio output device, such as a speaker or headphones.

In some embodiments, user system 302 includes an input device 320 for receiving input from user 301. Input device 320 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 315 and input device 320. User system 302 may also include a communication interface 325, which is communicatively connectable to a remote device such as server system 112 (shown in FIG. 2). Communication interface 325 may include, for example, a wired or wireless network adapter or a wireless data transceiver for use with a mobile phone network, Global System for Mobile communications (GSM), 3G, or other mobile data network or Worldwide Interoperability for Microwave Access (WIMAX).

Stored in memory area 310 are, for example, computer readable instructions for providing a user interface to user 301 via media output component 315 and, optionally, receiving and processing input from input device 320. A user interface may include, among other possibilities, a web browser and client application. Web browsers enable users, such as user 301, to display and interact with media and other information typically embedded on a web page or a website from server system 112. A client application allows user 301 to interact with a server application from server system 112.

Figure 5:
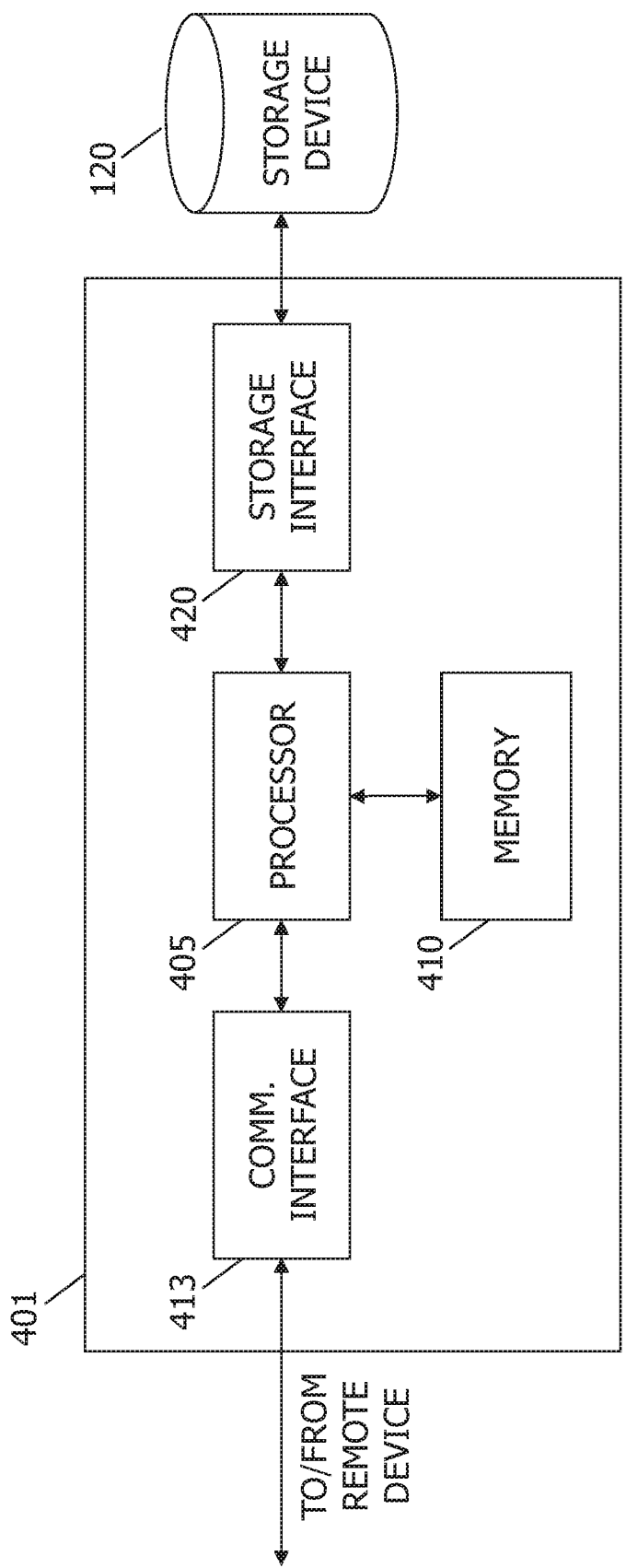

FIG. 5 illustrates an example configuration of a server system 401 such as the server system 112 that includes sales tax analysis computing device 150 (both shown in FIG. 2). Server system 401 may include, but is not limited to, database server 216 or sales tax analysis computing device 150 (both shown in FIG. 2). In some embodiments, server system 401 is similar to server system 112.

Server system 401 includes a processor 405 for executing instructions. Instructions may be stored in a memory area 410, for example. Processor 405 may include one or more processing units (e.g., in a multi-core configuration) for executing instructions. The instructions may be executed within a variety of different operating systems on the server system 401, such as UNIX, LINUX, Microsoft Windows®, etc. More specifically, the instructions may cause various data manipulations on data stored in storage 120 (e.g., create, read, update, and delete procedures). It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.)

Processor 405 is operatively coupled to a communication interface 413 such that server system 401 is capable of communicating with a remote device such as a user system or another server system 401. For example, communication interface 413 may receive communications from issuer computing devices 114 via the internet, as illustrated in FIG. 2.

Processor 405 may also be operatively coupled to database 120 (shown in FIG. 2). As described herein, database 120 is any computer-operated hardware suitable for storing and/or retrieving data. In some embodiments, database 120 is integrated in server system 401. In other embodiments, database 120 is external to server system 401. For example, server system 401 may include one or more hard disk drives as database 120. In other embodiments, database 120 is external to server system 401 and may be accessed by a plurality of server systems 401. For example, database 120 may include multiple storage units such as hard disks or solid state disks in a redundant array of inexpensive disks (RAID) configuration. Database 120 may include a storage area network (SAN) and/or a network attached storage (NAS) system.

In some embodiments, processor 405 is operatively coupled to database 120 via a storage interface 420. Storage interface 420 is any component capable of providing processor 405 with access to database 120. Storage interface 420 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 405 with access to database 120.

Memory area 410 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are examples only, and are thus not limiting as to the types of memory usable for storage of a computer program.

Figure 6:
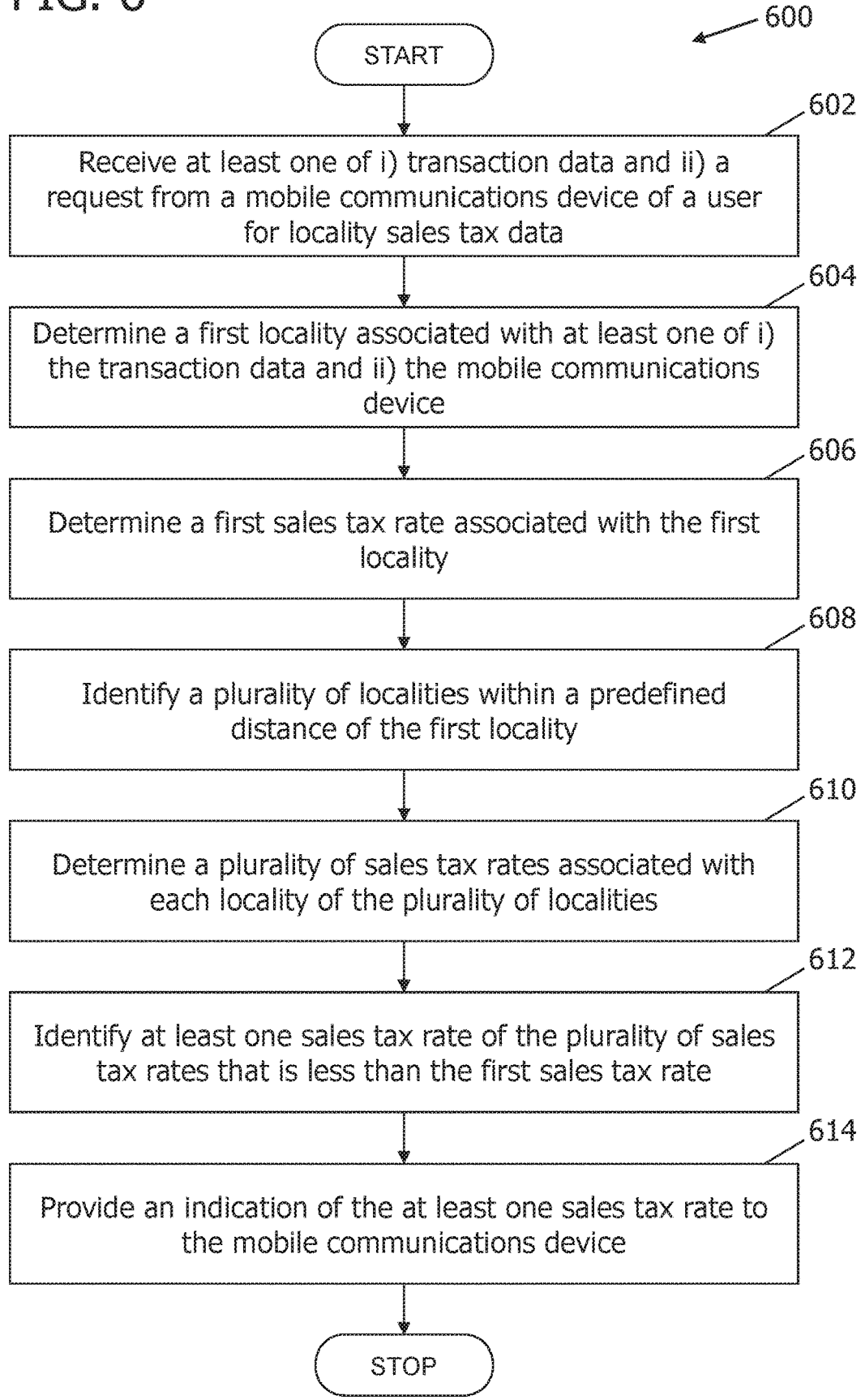

FIG. 6 is an example flow diagram illustrating a method 600 by which sales tax analysis computing device 150 (shown in FIG. 2) identifies a plurality of local sales tax rates within a predefined distance of a user and provides an indication, based upon the identification, of at least one locality associated with a sales tax rate that is lower than a sales tax rate of a locality physically occupied by the user. Accordingly, in the example embodiment, sales tax analysis computing device 150 receives at least one of transaction data and/or a request from a mobile communications device of the user (e.g., user computing device 170, shown in FIG. 2) for locality sales tax data (step 602).

For example, sales tax analysis computing device 150 may receive transaction data in response to a purchase initiated by a user at a merchant location. Alternatively, sales tax analysis computing device 150 may receive a request, such as a request initiated by a user via user computing device 170, for sales tax locality data (e.g., a request initiated by the user from a software application or "app" running on user computing device 170). A user may initiate such a request prior to making a purchase, such as, for example, to identify a merchant in a locality associated with a lowest, or lower sales tax rate than the locality presently occupied by the user. In other words, a user may initiate such a request prior to making a purchase to determine whether the purchase might be made, such as from a neighboring or adjacent locality, at a lower sales tax rate.

In response to receiving the transaction data and/or the request from user computing device 170, sales tax analysis computing device 150 may determine a locality (e.g., a "first locality") associated with the transaction data and/or user computing device 170 (step 604). For example, when transaction data is received (indicating that the user has already made a purchase), sales tax analysis computing device 150 may analyze the transaction data to determine a locality associated with the transaction. In some cases, the transaction data may include or identify the locality. However, in other cases, sales tax analysis computing device 150 may analyze the transaction data to identify a merchant from which the purchase was made, at which point sales tax analysis computing device 150 may identify a locality associated with the merchant, such as by retrieving the locality from a database table of merchant localities. On the other hand, in the case of a request from user computing device 170 for locality sales tax data, sales tax analysis computing device 150 may determine a location of user computing device 170, such as based upon location data (e.g., a GPS location) transmitted by user computing device 170 to sales tax analysis computing device 150 with the request.

Once the location of the user is known (e.g., either by way of the merchant location associated with a purchase initiated by the user or by way of the location of user computing device 170), sales tax analysis computing device 150 may determine a sales tax rate (e.g., a "first sales tax rate") associated with the locality currently occupied by the user (and/or occupied by the user at the time of purchase) (step 606). As described above, this sales tax rate may be retrieved from a database of sales tax rates (such as database 120, as shown in FIG. 2) and/or identified from any other suitable source of locality sales tax rates (e.g., any publicly available source of locality sales tax rates).

In some embodiments, the sales tax analysis computing device 150 may retrieve a look-up table of locality sales tax rates from a database (e.g., database 120) and/or any other publicly available source of locality sales tax data, such as from a flat file or spreadsheet published by a state, city, and/or locality. Similarly, in some embodiments, sales tax analysis computing device 150 may build, generate, and/or modify a database (including, for example, one or more database tables and/or one or more look-up tables) that contains locality sales tax rates and/or other locality data, such as geographic locations associated with one or more localities. Thus, during operation, sales tax analysis computing device 150 may rapidly or immediately (e.g., in real-time and/or near real-time) retrieve sales tax data associated with one or more localities, geographic locations associated with one or more localities, and the like.

Further, in some embodiments, a sales tax rate may be identified or determined for a locality based upon transaction data, such as, for example, in the case that the user initiates a purchase within the locality. For example, sales tax analysis computing device 150 may analyze the transaction data to determine a locality sales tax rate imposed on the transaction. The determined sales tax rate may be populated in the database of sales tax rates (e.g., database 120) described above to build or update the database. In addition, in at least some embodiments, a sales tax rate that is determined based on transaction data may be cross-referenced against an existing sales tax rate stored in the database, such as, for example, to verify and/or update an existing sales tax rate of a locality.

In the example embodiment, sales tax analysis computing device 150 may, in addition, identify a plurality of localities within a predefined distance of the locality occupied by the user (step 608). For example, in some embodiments, the user may provides an indication, such as via user computing device 170, of a distance or range that the user is willing to travel to take advantage of a lower locality sales tax rate (e.g., 5 miles, 10 miles, 15 miles, 20 miles, 25 miles, 50 miles, etc.) This user provided distance or range may function, as described herein, as the predefined distance. In other cases, such as, for example, where a user does not select a predefined distance, sales tax analysis computing device 150 may set a default predefined distance.

Irrespective of the manner in which the predefined distance is set and/or determined, sales tax analysis computing device 150 may determine a sales tax rate associated with each locality of a plurality of localities within the predefined distance (step 610). To make this determination, sales tax analysis computing device 150 may identify the plurality of localities within the predefined distance, such as based upon locality data contained within database 120. In some embodiments, sales tax analysis computing device 150 may identify the plurality of localities based upon map data, such as map data that specifies a plurality of localities in relation (including distances) to one another. In yet another embodiment, sales tax analysis computing device 150 may identify the plurality of localities within range of a user based upon a look-up table, a spreadsheet, and/or any other publicly available source of locality data. Once the plurality of localities are identified, the locality sales tax rate associated with each locality may be determined, as described herein, such as based upon a database of sales tax rates (such as database 120) and/or any other suitable source of locality sales tax rates (e.g., any publicly available source of locality sales tax rates).

In the example embodiment, sales tax analysis computing device 150 may, in addition, compare the sales tax rate associated with the user's present locality (e.g., the "first sales tax rate") to the plurality of sales tax rates identified for neighboring localities (e.g., localities, as described above, that are within the predefined distance of the first locality). Based upon the comparison, sales tax analysis computing device 150 may identify at least one sales tax rate of the plurality of sales tax rates that is less than the first sales tax rate (step 612). For example, sales tax analysis computing device 150 may identify a "second sales tax rate" associated with a "second locality" that is within the predefined distance of the first locality and that offers a lower sales tax rate than the sales tax rate offered by the first locality.

On completion of this step, sales tax analysis computing device 150 may provide an indication to user computing device 170 of the at least one sales tax rate (step 614). For example, sales tax analysis computing device 150 may provide an indication of a locality name, a locality location, a distance to the locality, and the like, such as in the form of a text message or email delivered to user computing device 170, a message delivered to a mobile application running on user computing device 170, and the like. Specifically, sales tax analysis computing device 150 may generate a "code snippet," which may cause user computing device 170 to provide or display the indication described above. As used herein, a "code snippet" may include any data that may be provided to user computing device 170 and/or interpreted by user computing device 170 to cause to user computing device 170 to display information, such as sales tax information and/or locality information, to the user.

In some embodiments, sales tax analysis computing device 150 may also provide navigation instructions to user computing device 170, which may be provided, within user computing device 170, to a navigation application (e.g., GOOGLE MAPS, APPLE MAPS, and the like) running on user computing device 170, and which may serve to guide the user to the locality and/or one or more merchants occupying the locality from which the user may make a desired purchase at a lower sales tax rate.

For example, in the instance that a user has yet to make a purchase and has requested locality sales tax data via user computing device 170 (as described above), sales tax analysis computing device 150 may receive an indication of an item that the user wishes to purchase (such as via a software application or "app" running on user computing device 170). In response, sales tax analysis computing device 150 may determine whether the item is available for purchase within the user's present locality (e.g., within the "first locality") and if so, what the local sales tax imposed on the item would be within the first locality. Sales tax analysis computing device 150 may, in addition, determine a price of the item, as advertised by one or more merchants residing in the first locality. With these two pieces of information (e.g., item price and locality sales tax rate), sales tax analysis computing device 150 may determine a total price of the item if purchased from one or more merchants in the first locality.

Similarly, sales tax analysis computing device 150 may determine whether the item is available for purchase from one or more merchants within one or more neighboring localities (e.g., localities within the predefined distance), and if so, what the local sales tax imposed on the item would be within these neighboring localities. Sales tax analysis computing device 150 may, in addition, determine a price of the item, as advertised by one or more merchants residing in the neighboring localities. With these two pieces of information (e.g., item price and locality sales tax), sales tax analysis computing device 150 may determine a total price of the item from one or more merchants in the neighboring localities.

In the example embodiment, sales tax analysis computing device 150 may, based upon the total item prices calculated as described above, compare each total item price to determine whether it would be less expensive for the user to purchase the item, including the locality sales tax, from a merchant in a neighboring locality. If so, sales tax analysis computing device 150 may provide an indication, as described above, to user computing device 170 of one or more neighboring localities and/or merchant locations from which the user may make the user's desired purchase at a reduced cost to the user (in comparison to the total cost of the item in the first locality).

Similarly, in the circumstance that the user has already purchased an item in a particular locality (e.g., the "first locality"), sales tax analysis computing device 150 may simply determine the purchase price paid for the item by the user in the first locality, including sales tax imposed by the first locality, to initiate a comparison between what the user actually paid in the first locality to prices the user might have paid, including various locality taxes, in one or more neighboring localities. This data may be provided to the user, as described above, such that the user is, at a minimum, made aware of the availability of the item at a reduced cost to the user in a neighboring locality and, such that the user is able, if desired, to return the purchased item to the merchant in the first locality, whereupon the user may travel a short distance to the neighboring locality to purchase the same item from a different merchant (or the same merchant at a different merchant location) at a reduced cost.

Similarly, the systems and methods described herein may be deployed by users confronted by ballot questions related to increases in local or community sales tax rates. For example, a user who encounters a ballot question enquiring whether the user supports an in increase in the sales tax rate associated with the user's locality may consult the software application described herein and running on user computing device 170 to quickly and easily ascertain an extant locality tax as well as what the extant locality tax is in comparison to neighboring localities. This data may provide the user with valuable insight, for example, into the fact that a proposed sales tax rate increase would result in a total locality sales that is substantially greater than other locality sales tax rates implemented in neighboring localities or, on the other hand, that such a proposed increase would not result in a total locality sales tax disproportionate to locality sales taxes imposed by neighboring localities.

Figure 7:
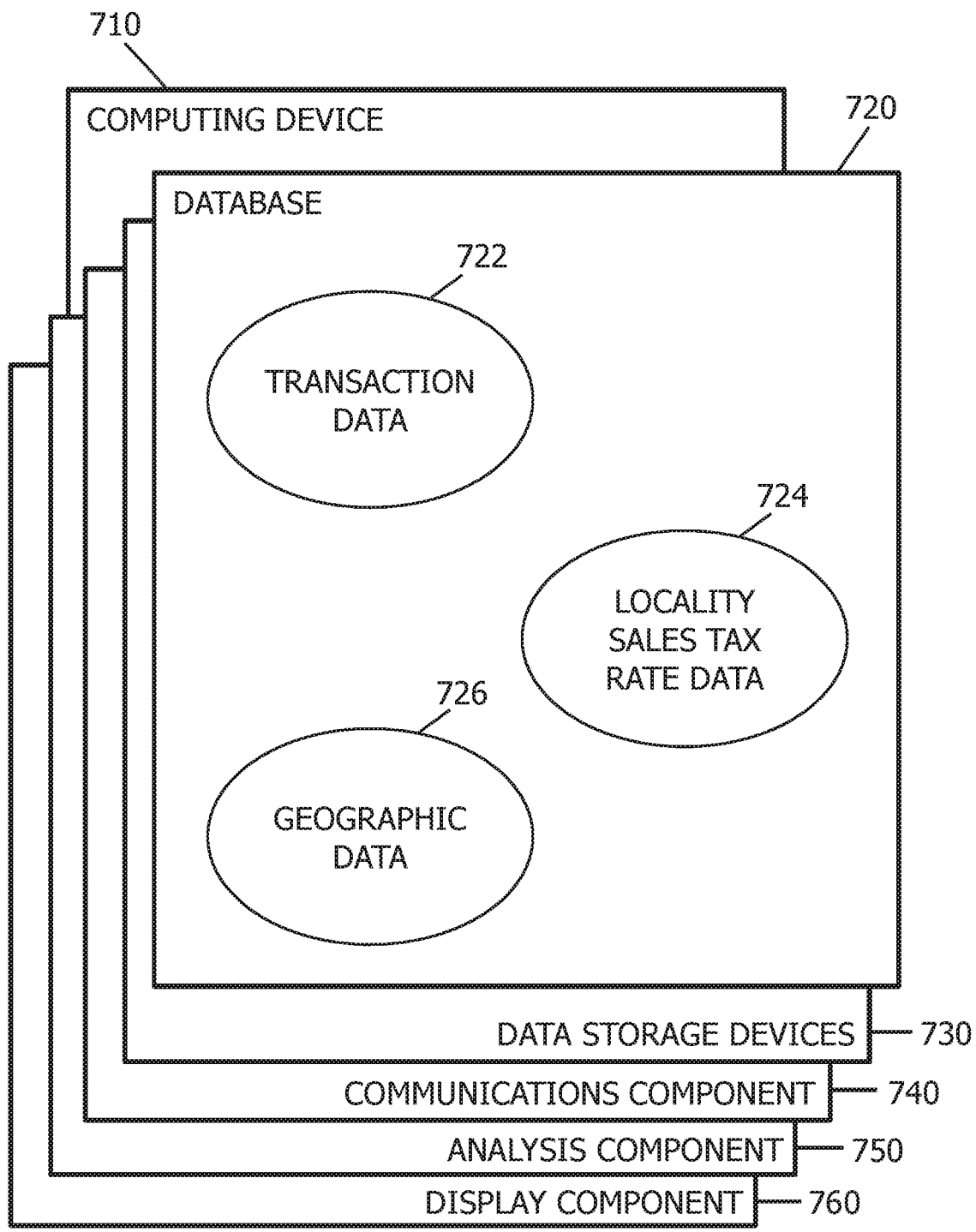

FIG. 7 shows an example configuration of a database 720 within a computing device 710, along with other related computing components, that may be used to identify a plurality of local sales tax rates within a predefined distance of a user and provide an indication, based upon the identification, of at least one locality associated with a sales tax rate that is lower than a sales tax rate of a locality physically occupied by the user, as described herein. In some embodiments, computing device 710 is similar to server system 112 (shown in FIG. 2). In some embodiments, database 720 is similar to database 120 (shown in FIG. 2). In the example embodiment, database 720 includes transaction data 722 and sales tax data for a plurality of localities 724, as described above. Database 720 may also include geographic information 726 associated with each locality of the plurality of localities and/or one or more geographic relationships between one or more localities of the plurality of localities.

Computing device 710 also includes data storage devices 730. Computing device 710 also includes communications component 740 that may perform, for example, the receiving at least one of i) transaction data and ii) a request from a mobile communications device of a user for locality sales tax data, as described with respect to FIG. 6. Further, computing device 710 also includes an analysis component 750 that may perform the determining a first locality associated with at least one of i) the transaction data and ii) the mobile communications device, as described in FIG. 6. The analysis component 750 may also perform the determining a first sales tax rate associated with the first locality, identifying a plurality of localities within a predefined distance of the first locality, determining a plurality of sales tax rates associated with each locality of the plurality of localities, and identifying at least one sales tax rate of the plurality of sales tax rates that is less than the first sales tax rate, as described in FIG. 6. In addition, computing device 710 also includes a display component 760 that may perform a display function, such as providing an indication of the at least one sales tax rate to the mobile communications device, as described in FIG. 6.

As will be appreciated based on the foregoing specification, the above-described embodiments of the disclosure may be implemented using computer programming or engineering techniques including computer software, firmware, hardware or any combination or subset thereof, wherein the technical effect is to identify a plurality of local sales tax rates within a predefined distance of a user and provide an indication, based upon the identification, of at least one locality associated with a sales tax rate that is lower than a sales tax rate of a locality physically occupied by the user. Any such resulting program, having computer-readable code means, may be embodied or provided within one or more computer-readable media, thereby making a computer program product, (i.e., an article of manufacture), according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A sales tax analysis computing device comprising at least one processor in communication with at least one memory device, said sales tax analysis computing device configured to:
   build a database table of locality sales tax data, the database table comprising a plurality of sales tax rates, each sales tax rate of the plurality of sales tax rates associated with a particular locality;
   receive transaction data from a merchant computing device via an interchange network, the transaction data received in response to a payment transaction initiated by a user with a merchant for a purchase of goods or services, the transaction data including a purchase amount, merchant information of the merchant, and account information of an account of the user tendered for the payment transaction;
   analyze the transaction data to determine a first locality associated with the transaction data;
   determine, based on the database table, a first sales tax rate associated with the first locality;
   identify, based on the database table, at least one sales tax rate of the plurality of sales tax rates that is less than the first sales tax rate;
   generate a code snippet that includes the identified at least one sales tax rate; and
   provide the code snippet to a mobile communications device associated with the user, the code snippet comprising computer-implemented instructions configured to cause the mobile communications device to display at least one of i) the identified at least one sales tax rate, ii) a map indicating a locality associated with the identified at least one sales tax rate, and iii) a difference between a cost of an item in the first locality and a cost of the item in a second locality.

2. The sales tax analysis computing device of claim 1, wherein to determine the first locality, the sales tax analysis computing device is further configured to analyze the merchant information to identify the first locality.

3. The sales tax analysis computing device of claim 1, wherein to determine the first sales tax rate, the sales tax analysis computing device is further configured to retrieve the first sales tax rate from the database table.

4. The sales tax analysis computing device of claim 1, wherein the sales tax analysis computing device is further configured to:
   identify a plurality of localities within a predefined distance of the first locality; and
   determine, based on the database table, the plurality of sales tax rates based on the plurality of localities within the predefined distance of the first locality.

5. The sales tax analysis computing device of claim 1, wherein the sales tax analysis computing device is further configured to:
   determine, based on the transaction data, the cost of the item in the first locality, the cost of the item in the first locality including the first sales tax rate;
   determine the cost of the item in the second locality, the cost of the item in the second locality including a second sales tax rate associated with the second locality; and
   provide an indication of the cost of the item in the second locality to the mobile communications device.

6. The sales tax analysis computing device of claim 1, wherein the sales tax analysis computing device is further configured to:
   determine, from the transaction data, an indication of the item;
   identify the second locality based on an availability for purchase of the item within the second locality;
   compare the cost of the item in the first locality including the first sales tax rate to the cost of the item in the second locality including a second sales tax rate;
   determine, based upon the comparing, which of the cost of the item in the first locality and the cost of the item in the second locality is lower; and
   provide an indication of the determined lower cost to the mobile communications device, the indication identifying one of i) the first locality and ii) the second locality.

7. The sales tax analysis computing device of claim 6, wherein the sales tax analysis computing device is further configured to provide navigation instructions to the mobile communications device, the navigation instructions identifying a merchant offering the item for sale at the determined lower cost.

8. A non-transitory computer readable medium that includes executable instructions for identifying local sales tax rates, wherein when executed by a sales tax analysis computing device comprising at least one processor in communication with at least one memory device, the computer executable instructions cause the sales tax analysis computing device to:
   build a database table of locality sales tax data, the database table comprising a plurality of sales tax rates, each sales tax rate of the plurality of sales tax rates associated with a particular locality;
   receive transaction data from a merchant computing device via an interchange network, the transaction data received in response to a payment transaction initiated by a user with a merchant for a purchase of goods or services, the transaction data including a purchase amount, merchant information of the merchant, and account information of an account of the user tendered for the payment transaction;
   analyze the transaction data to determine a first locality associated with the transaction data;
   determine, based on the database table, a first sales tax rate associated with the first locality;
   identify, based on the database table, at least one sales tax rate of the plurality of sales tax rates that is less than the first sales tax rate;
   generate a code snippet that includes the identified at least one sales tax rate; and
   provide the code snippet to a mobile communications device associated with the user, the code snippet comprising computer-implemented instructions configured to cause the mobile communications device to display at least one of i) the identified at least one sales tax rate, ii) a map indicating a locality associated with the identified at least one sales tax rate, and iii) a difference between a cost of an item in the first locality and a cost of the item in a second locality.

9. The non-transitory computer readable medium of claim 8, wherein to determine the first locality, the computer executable instructions cause the sales tax analysis computing device to analyze the merchant information to identify the first locality.

10. The non-transitory computer readable medium of claim 8, wherein to determine the first sales tax rate, the computer executable instructions cause the sales tax analysis computing device to retrieve the first sales tax rate from the database table.

11. The non-transitory computer readable medium of claim 8, wherein the computer executable instructions further cause the sales tax analysis computing device to:
identify a plurality of localities within a predefined distance of the first locality; and
determine, based on the database table, the plurality of sales tax rates based on the plurality of localities within the predefined distance of the first locality.

12. The non-transitory computer readable medium of claim 8, wherein the computer executable instructions further cause the sales tax analysis computing device to:
determine, based on the transaction data, the cost of the item in the first locality, the cost of the item in the first locality including the first sales tax rate;
determine the cost of the item in the second locality, the cost of the item in the second locality including a second sales tax rate associated with the second locality; and
provide an indication of the cost of the item in the second locality to the mobile communications device.

13. The non-transitory computer readable medium of claim 8, wherein the computer executable instructions further cause the sales tax analysis computing device to:
determine, from the transaction data, an indication of the item;
identify the second locality based on an availability for purchase of the item within the second locality;
compare the cost of the item in the first locality including the first sales tax rate to the cost of the item in the second locality including a second sales tax rate;
determine, based upon the comparing, which of the cost of the item in the first locality and the cost of the item in the second locality is lower; and
provide an indication of the determined lower cost to the mobile communications device, the indication identifying one of i) the first locality and ii) the second locality.

14. The non-transitory computer readable medium of claim 13, wherein the computer executable instructions further cause the sales tax analysis computing device to provide navigation instructions to the mobile communications device, the navigation instructions identifying a merchant offering the item for sale at the determined lower cost.

15. A computer-based method for identifying local sales tax rates, said method performed using a sales tax analysis computing device comprising at least one processor in communication with at least one memory device, said method comprising:
building a database table of locality sales tax data, the database table comprising a plurality of sales tax rates, each sales tax rate of the plurality of sales tax rates associated with a particular locality;
receiving transaction data from a merchant computing device via an interchange network, the transaction data received in response to a payment transaction initiated by a user with a merchant for a purchase of goods or surfaces, the transaction data including a purchase amount, merchant information of the merchant, and account information of an account of the user tendered for the payment transaction;
analyzing the transaction data to determining a first locality associated with the transaction data;
determining, based on the database table, a first sales tax rate associated with the first locality;
identifying, based on the database table, at least one sales tax rate of the plurality of sales tax rates that is less than the first sales tax rate;
generating a code snippet that includes the identified at least one sales tax rate; and
providing the code snippet to a mobile communications device associated with the user, the code snippet comprising computer-implemented instructions configured to cause the mobile communications device to display at least one of i) the identified at least one sales tax rate, ii) a map indicating a locality associated with the identified at least one sales tax rate, and iii) a difference between a cost of an item in the first locality and a cost of the item in a second locality.

16. The method of claim 15, wherein determining the first locality further comprises analyzing the merchant information to identify the first locality.

17. The method of claim 15, wherein determining the first sales tax rate further comprises retrieving the first sales tax rate from the database table.

18. The method of claim 15, further comprising:
identifying a plurality of localities within a predefined distance of the first locality; and
determining, based on the database table, the plurality of sales tax rates based on the plurality of localities within the predefined distance of the first locality.

19. The method of claim 15, further comprising:
determining, based on the transaction data, the cost of the item in the first locality, the cost of the item in the first locality including the first sales tax rate;
determining the cost of the item in the second locality, the cost of the item in the second locality including a second sales tax rate associated with the second locality; and
providing an indication of the cost of the item in the second locality to the mobile communications device.

20. The method of claim 15, further comprising:
determining, from the transaction data, an indication of the item;
identifying the second locality based on an availability for purchase of the item within the second locality;
comparing the cost of the item in the first locality including the first sales tax rate to the cost of the item in the second locality including a second sales tax rate;
determining, based upon the comparing, which of the cost of the item in the first locality and the cost of the item in the second locality is lower; and
providing an indication of the determined lower cost to the mobile communications device, the indication identifying one of i) the first locality and ii) the second locality.

* * * * *